United States Patent
Smed

(10) Patent No.: US 6,883,807 B2
(45) Date of Patent: Apr. 26, 2005

(54) MULTIDIRECTIONAL TURBINE SHIM SEAL

(75) Inventor: Jan P. Smed, Winter Springs, FL (US)

(73) Assignee: Seimens Westinghouse Power Corporation, Orlando, FL (US)

(*) Notice: Subject to any disclaimer, the term of this patent is extended or adjusted under 35 U.S.C. 154(b) by 36 days.

(21) Appl. No.: 10/244,132

(22) Filed: Sep. 13, 2002

(65) Prior Publication Data

US 2004/0051254 A1 Mar. 18, 2004

(51) Int. Cl.$^7$ .............................................. F16J 15/02
(52) U.S. Cl. ..................... 277/644; 277/641; 277/649; 415/139
(58) Field of Search ................................ 277/630, 641, 277/642, 644, 648, 649; 415/134, 139

(56) References Cited

U.S. PATENT DOCUMENTS

| | | | |
|---|---|---|---|
| 1,816,293 A | * | 7/1931 | Oberhuber .................... 29/558 |
| 2,898,000 A | * | 8/1959 | Hanny ......................... 277/649 |
| 3,362,681 A | * | 1/1968 | Smuland ...................... 415/115 |
| 3,751,048 A | * | 8/1973 | Rode ........................... 277/649 |
| 3,801,220 A | * | 4/1974 | Beckershoff ............... 416/198 R |
| 3,869,222 A | * | 3/1975 | Rahnke et al. .............. 415/134 |
| 3,975,114 A | * | 8/1976 | Kalkbrenner ............. 415/210.1 |
| 4,063,845 A | | 12/1977 | Allen |
| 4,477,086 A | | 10/1984 | Feder et al. |
| 4,537,024 A | | 8/1985 | Grosjean |
| 4,812,105 A | * | 3/1989 | Heymann .................... 415/134 |
| 4,897,021 A | | 1/1990 | Chaplin et al. |
| 4,902,198 A | | 2/1990 | North |
| 5,058,906 A | * | 10/1991 | Adamek et al. ............. 277/614 |
| 5,080,557 A | | 1/1992 | Berger |
| 5,088,888 A | | 2/1992 | Bobo |
| 5,104,286 A | | 4/1992 | Donlan |
| 5,125,796 A | | 6/1992 | Cromer |
| 5,127,799 A | * | 7/1992 | Berry ......................... 415/170.1 |
| 5,154,577 A | | 10/1992 | Kellock et al. |
| 5,158,430 A | | 10/1992 | Dixon et al. |
| 5,167,485 A | | 12/1992 | Starkweather |
| 5,167,488 A | | 12/1992 | Ciokajlo et al. |
| 5,221,096 A | | 6/1993 | Heldreth et al. |
| 5,333,995 A | | 8/1994 | Jacobs et al. |
| 5,354,072 A | | 10/1994 | Nicholson |
| 5,531,457 A | | 7/1996 | Tibbott et al. |
| 5,586,773 A | | 12/1996 | Bagepalli et al. |
| 5,624,227 A | | 4/1997 | Farrell |
| 5,627,227 A | | 5/1997 | Suga et al. |
| 5,657,998 A | | 8/1997 | Dinc et al. |
| 5,709,530 A | | 1/1998 | Cahill et al. |
| 5,762,472 A | | 6/1998 | Pizzi et al. |
| 5,797,723 A | | 8/1998 | Frost et al. |
| 5,820,338 A | | 10/1998 | Kasprow et al. |
| 5,823,741 A | | 10/1998 | Predmore et al. |
| 5,865,600 A | | 2/1999 | Mori et al. |
| 5,868,398 A | | 2/1999 | Maier et al. |
| 5,915,697 A | | 6/1999 | Bagepalli et al. |
| 5,927,942 A | | 7/1999 | Stahl et al. |
| 5,934,687 A | | 8/1999 | Bagepalli et al. |
| 5,957,658 A | | 9/1999 | Kasprow et al. |
| 5,975,844 A | | 11/1999 | Milazar et al. |
| 5,988,975 A | | 11/1999 | Pizzi |
| 5,997,247 A | * | 12/1999 | Arraitz et al. .............. 415/139 |

(Continued)

Primary Examiner—Alison K. Pickard

(57) ABSTRACT

A turbine seal closure mechanism for sealing an opening in a turbine component or between one or more turbine components. The turbine seal may include a main body having a longitudinal axis positioned transverse to the axial direction of the turbine and having at least one arm for sealing the main body to a surface of a turbine component and configured to fit within a recess in a turbine component. The turbine seal may also have one or more arms coupled to a side of the main body opposite to the first side having arms attached thereto for sealing the turbine seal to another turbine surface.

10 Claims, 2 Drawing Sheets

U.S. PATENT DOCUMENTS

| | | |
|---|---|---|
| 6,042,334 A | 3/2000 | Schilling |
| 6,079,944 A | 6/2000 | Tomita et al. |
| 6,086,329 A | 7/2000 | Tomita et al. |
| 6,144,656 A | 11/2000 | Kinnunen et al. |
| 6,162,014 A | 12/2000 | Bagepalli et al. |
| 6,164,656 A | 12/2000 | Frost |
| 6,193,240 B1 | 2/2001 | Johnson et al. |
| 6,199,871 B1 | 3/2001 | Lampes |
| 6,217,279 B1 | 4/2001 | Ai et al. |
| 6,237,921 B1 | 5/2001 | Liotta et al. |
| 6,261,063 B1 | 7/2001 | Chikami et al. |
| 6,290,459 B1 | 9/2001 | Correia |
| 6,312,218 B1 | 11/2001 | Beeck et al. |
| 6,386,825 B1 | 5/2002 | Burdgick |
| 6,398,499 B1 | 6/2002 | Simonetti et al. |
| 6,402,466 B1 | 6/2002 | Burdgick et al. |
| 6,406,256 B1 | 6/2002 | Marx |
| 6,412,149 B1 | 7/2002 | Overberg |
| 6,413,042 B1 | 7/2002 | Correia |
| 6,418,727 B1 | 7/2002 | Rice et al. |
| 6,431,555 B1 | 8/2002 | Schroder et al. |
| 6,431,825 B1 | 8/2002 | McLean |
| 2001/0019695 A1 | 9/2001 | Correia |

\* cited by examiner

MULTIDIRECTIONAL TURBINE SHIM SEAL

CROSS REFERENCE TO RELATED APPLICATIONS

Not Applicable

STATEMENT REGARDING FEDERALLY SPONSORED RESEARCH

Not Applicable

FIELD OF THE INVENTION

The present invention relates in general to sealing systems and, more particularly, to sealing systems for sealing gaps within a single turbine component or between two or more turbine components.

BACKGROUND OF THE INVENTION

In the art of turbine design, the need often exists to seal connections between adjacent turbine components, such as turbine blades, in order to separate fluids and to maintain a turbine's efficiency. For instance, it is desirable to separate pressurized air from hot gases in specific locations in a turbine assembly. A common location for separating these gases is at the intersection between adjacent turbine blades proximate to a turbine housing to which the turbine blades are connected.

Typically, baffles, or "key seals," are implemented, as shown in FIG. 1, to separate cooled air located in interior aspects of a rotor assembly from hot gases located around the turbine blades of a turbine assembly. Most often, the baffles are positioned in recesses, or grooves, located in protrusions in the turbine assembly. The baffles typically are made of hard materials that block a significant portion of the openings between the turbine blades. Most baffles are inflexible and thus are configured to have a small amount of clearance to prevent binding, gauling, or other types of interferences. Thus, as shown by the arrow signifying air flow in FIG. 1, air is capable of leaking around the baffle. Such leakage reduces the efficiency of the turbine and can lead to harmful results.

An alternative baffle has been developed and is shown in U.S. Pat. No. 5,865,600 to Mori et al. The baffle system disclosed in Mori comprises a baffle formed from metallic belt-like members having a cross-section with two ends, whereby each end includes two sealing members that are biased away from each other and wrap circumferentially around the longitudinal axis of a turbine rotor assembly. This configuration gives the baffle a spring-like effect when the sealing members are squeezed together. The cross-section of this belt is oriented generally orthogonal to the axial direction. Thus, Mori discloses a baffle formed from a belt having improved sealing qualities. However, Mori discloses sealing the opening only in the radial direction.

A typical turbine engine usable in power plant applications has numerous openings with diameters between about ⅛ of an inch and 1/10 of an inch. Equivalent openings in turbines usable in an aircraft applications are even smaller. Sealing such small openings with relatively inflexible seals, such as the seals disclosed in Mori, is challenging. Furthermore, manufacturing complex seals with dimensions corresponding to such small openings is difficult at least because of the increased difficulty encountered in manufacturing complex aspects of such seals. For instance, creating spot welds, as shown in FIGS. 2 and 3(a) of Mori and identified as element 13, and small slits, as shown in FIG. 3(b) and identified as element 16, in seals having such small dimensions is difficult and costly.

Thus, a need exists for a relatively simple turbine seal capable of securely sealing an opening between turbine components in the radial direction, the axial direction, and the circumferential direction normal to the axial direction.

SUMMARY OF THE INVENTION

Set forth below is a brief summary of the invention that solves the foregoing problems and provides benefits and advantages in accordance with the purposes of the present invention as embodied and broadly described herein. This invention is directed to a turbine seal for sealing openings in or between turbine components in the radial direction, the axial direction, and in the circumferential direction, normal to the axial direction. One embodiment of the turbine seal of this invention includes a main body configured to fit in a recess in a turbine component to seal the turbine seal to the recess. The main body includes a longitudinal axis that may be positioned generally parallel to the axial direction. The turbine seal also includes two arms for engaging a surface of a turbine component, each of which extend from the main body in the same general direction and are generally parallel to each other. The turbine seal further includes a center sealing member, otherwise referred to as a third arm, positioned between the two arms described above for sealing an opening from fluid movement in the axial direction.

The turbine seal may further include a sealing mechanism on the ends of the arms configured to contact a surface of a turbine component. The sealing mechanism may be composed of numerous designs, such as, but not limited to, one or more protrusions. Furthermore, the sealing mechanism may be composed of the same material used to form the arms or may be formed of other suitable materials.

In another embodiment of the turbine seal, the main body is not configured to fit in a recess in a turbine component. Rather, a side of the main body, opposite to the side to which the first and second arms and the center sealing member are coupled, includes two sealing arms, referred to as fourth and fifth arms, and may or may not include a center sealing member attached to the main body and positioned between the fourth and fifth arms. This turbine seal operates by sealing an opening using the first and second arms on one side of the opening and the fourth and fifth arms on the other side of the opening.

An object of this invention includes, but is not limited to, sealing an opening in a turbine component in the axial direction, the radial direction, and the circumferential direction, normal or generally orthogonal to the axial direction.

An advantage of this invention is that the turbine seal may be positioned in a turbine assembly so that a longitudinal axis of the turbine seal is generally transverse to the axial direction of the turbine blade assembly.

Yet another advantage of this invention is that this invention provides a turbine seal that is flexible and capable of absorbing vibrations typically encountered during turbine operation.

DETAILED DESCRIPTION OF THE INVENTION

Figure 1:
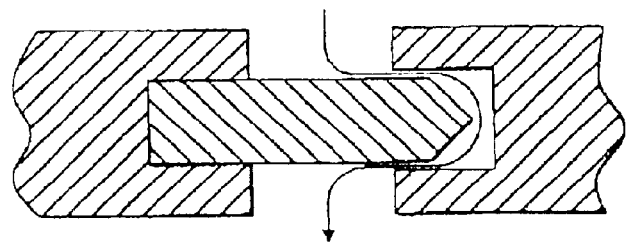
FIG. 1 is a cross-sectional view of a prior art gas turbine rotor component sealing system.
Figure 2:
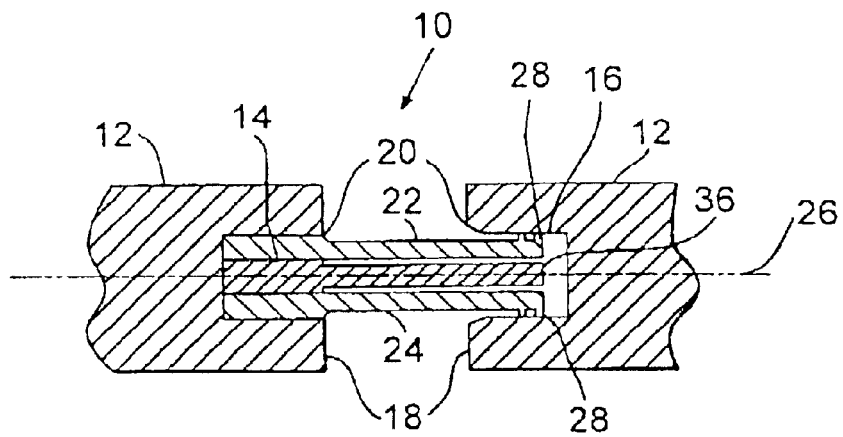
FIG. 2 is a cross-sectional view in the axial direction of an exemplary embodiment of this invention showing turbine seal having a generally linear center sealing member.

The turbine seal 10 of this invention is usable to seal turbine components 12 together at various locations throughout a turbine assembly. As shown in FIG. 2, the turbine seal 10 includes a main body 14 having multiple arms extending from the main body 14 to engage a surface 16 of a turbine. The turbine seal 10 may be composed of any materials suitable for sealing fluids in turbines. These materials may differ, as evident to those skilled in the art, depending on the application of the turbine. In the embodiment shown in FIG. 2, the turbine components are protrusions 18 coupled to adjacent turbine blades. The protrusions include recesses 20, which may otherwise be referred to as grooves.

While this invention is shown positioned in contact with turbine components having certain configurations, this invention is not limited to use with such a turbine configuration. Rather, this invention may be used in any situation where a seal is needed to prevent or significantly restrict a fluid from passing a particular point in a turbine assembly. For instance, this invention may be used to close an opening in a single turbine component or between two or more turbine components.

The particular embodiment of the turbine seal shown in FIG. 2 includes a first arm 22 and a second arm 24 coupled to the main body 14. The first arm 22 extends generally laterally from the main body 14 and generally parallel to a longitudinal axis 26 of the turbine seal. The longitudinal axis 26 of the main body 14 is also generally transverse to the axis of rotation of the turbine. The second arm 24 extends from the main body 14 generally parallel to the first arm 22 and generally parallel to the longitudinal axis 26 of the turbine seal. In other embodiments, the first and second arms 22 and 24 may extend from the main body 14 at angles other than zero as referenced from the longitudinal axis 26 of the turbine seal.

In certain embodiments, the first arm 22 or the second arm 24, or both, include at least one sealing element 28 for coupling the turbine seal to a surface 16 of a turbine component. The sealing element 28 may be formed from numerous configurations. For instance, in one embodiment, the sealing element may be composed of at least one protrusion, and more specifically, may be composed of a first protrusion 30 and a second protrusion 32, as shown in FIGS. 2–5. The two protrusions may be spaced apart or positioned proximate to each other depending on the application.

The configuration of the sealing element 28 shown in FIGS. 2–5 forms a step seal 34 between the first and second protrusions 30 and 32. The step seal 34 receives any fluids that may pass between the first protrusion 30 and the surface 16 of a turbine component. The step seal 34 reduces the velocity of the fluid and total flow of fluid through the step seal 34, thereby reducing the likelihood that fluids will pass between the second protrusion 32 and the surface 16 of a turbine component. The sealing element 28 may be composed of the same material as the arm to which it is attached or may be composed of a different material. For instance, the sealing element 28 may be formed from a separate material and installed as an insert in the first arm 22.

The main body 14 in the embodiment shown in FIG. 2 is configured to be received in a recess 20 in a turbine component. Specifically, the main body 14 is configured to seal the main body 14 with the surface 16 of a turbine component. In one embodiment, the main body 14 is sized to fit tightly in the recess 20 to seal the main body 14 in the recess 20. The main body 14 may be fixed to the recess 20 using an adhesive, a resin, a weld, a stamping mechanism, or other conventional or non-conventional coupling method. Preferably, the main body 14 is attached to the turbine component with a weld or with brazing technology. In one embodiment, the main body 14 may be sized slightly larger than the recess 20 to provide an interference fit with the recess 20 of the turbine component.

Similarly, the first and second arms, 22 and 24, may include characteristics enabling the arms to be coupled to a surface 16 of a turbine component. For instance, the first arm 22 or the second arm 24, or both, can be biased generally orthogonal to the longitudinal axis 26 of the main body 14 of the turbine seal. Thus, when either or both arms are deflected towards the longitudinal axis 26, the arms attempt to return to the resting position. Such a configuration enables the arms to maintain contact with a surface 16 of a turbine component while the turbine is operating despite the often severe vibrations encountered.

Figure 3:
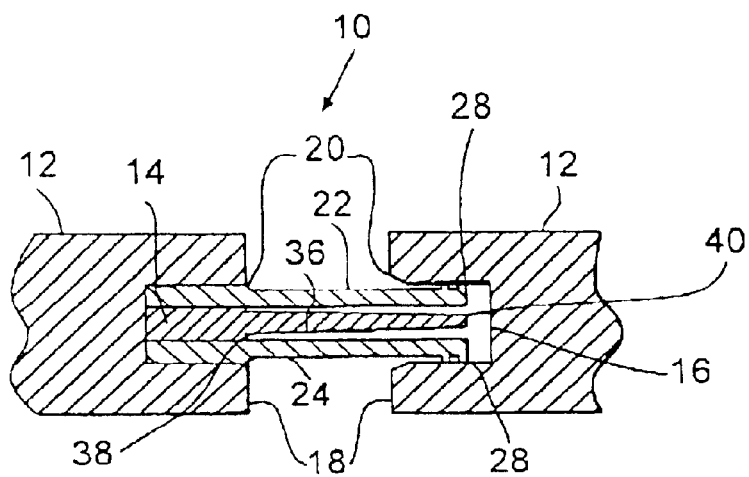
FIG. 3 is a cross-sectional view in the axial direction of another exemplary embodiment of this invention that resembles the embodiment shown in FIG. 2, but includes a tapered center sealing member.
Figure 4:
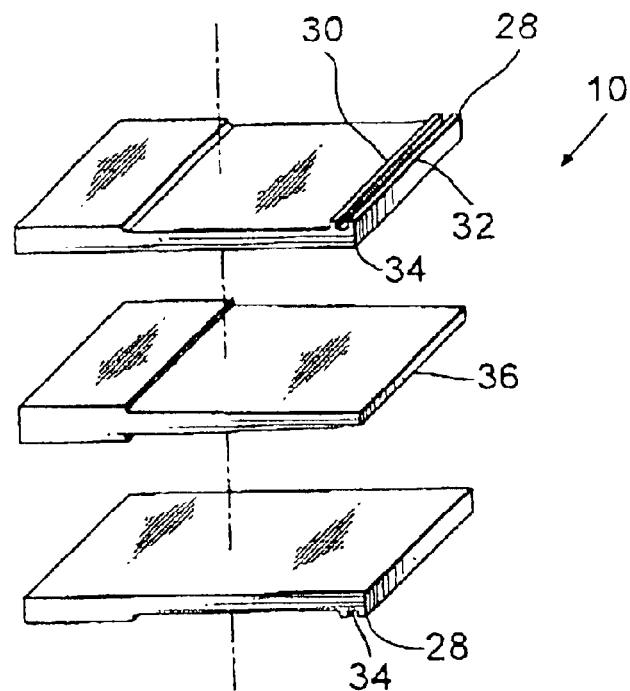
FIG. 4 is an exploded view in the axial direction of the turbine seal shown in FIG. 2.

The turbine seal 10 also includes a center sealing member 36, also referred to as a third arm. In one embodiment, the center sealing member 36 is positioned between first and second arms, 22 and 24, as shown in FIG. 2. The center sealing member prevents a fluid from flowing between the first and second arms, 22 and 24, in a direction that is generally normal to the plane in which FIG. 2 is drawn. The center sealing member 36 may have a generally constant thickness, as shown in FIG. 2, or the thickness may vary throughout its length. For instance, as shown in FIG. 3, the thickness of the center sealing member 36 gradually tapers from a first end 38 of the center sealing member to a second end 40 of the center sealing member. While the taper shown in FIG. 3 is a gradual taper, other tapers or different transitions, such as abrupt transitions, may be used.

Figure 5:
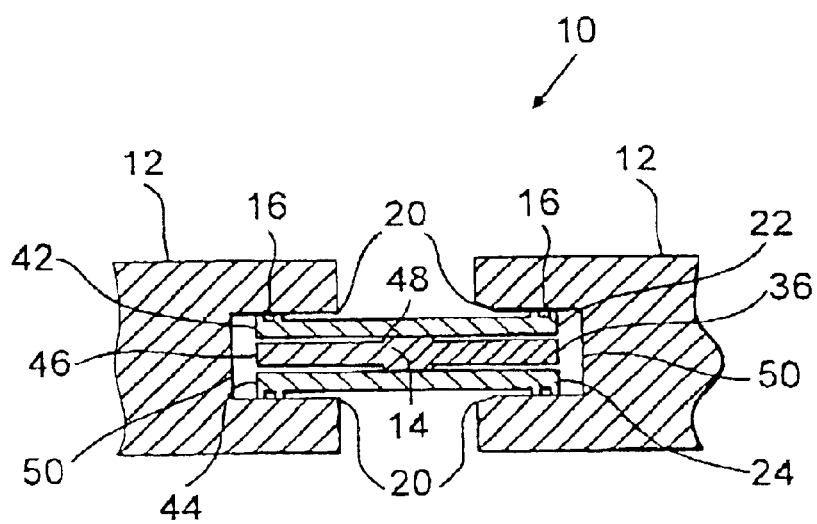
FIG. 5 is a cross-sectional view in the axial direction of another embodiment of this invention showing a turbine seal having multiple sealing arms on opposite ends of the main body of the turbine seal.

In another embodiment of the turbine seal, as shown in FIG. 5., the turbine seal 10 is configured generally as described above, except that the main body 14 is not designed to be a sealing mechanism in contact with a surface 16 of turbine component. That is not to say that the main body 16 cannot contact a surface of the turbine component. Instead, the turbine seal 10 includes a fourth and fifth arm, 42 and 44 respectively, and a second center sealing member 46, also referred to as a sixth arm, attached to a second side 48 of the main body 14 that is generally opposite to the first side to which the first and second arms, 22 and 24, and the center sealing member 36 are attached. The fourth and fifth arms, 42 and 44, and the second sealing member 46 may or may not be a mirror image of the first, second and third arms shown in FIG. 2 and described in detail above. In this embodiment, the first and second center sealing members 36 and 46 are coupled to the main body 14 between the first and second arms, 22 and 24, and the fourth and fifth arms, 42 and 44, respectively. In another embodiment, the turbine seal may only have one center sealing member, rather than two center sealing members, as shown in FIG. 5. One or more of the center sealing members may be tapered or have varying thickness, as previously described.

As with the first and second arms 22 and 24, the fourth or fifth arms, 42 and 44, or both, may include one or more sealing elements 28 for coupling the respective arm to a surface 16 of a turbine component, which may be the inside surface of a recess 20 in a turbine rotor assembly, as shown in FIG. 5. As previously mentioned, the sealing mechanism may be configured in numerous manners, all of which are applicable to sealing elements 28 coupled to the fourth and fifth arms, 42 and 44.

In the embodiment shown in FIG. 5, the turbine seal may be positioned using abutments 50 positioned within recesses. Specifically, the abutments 50 may be positioned to prevent the arms, 22, 24, 42, and 44, from being removed from being in contact with a turbine surface. Furthermore, the abutments 50 may reduce wear of the turbine seal 10 by preventing excessive movement of the turbine seal 10. Finally, the abutments 50 may have numerous configurations.

The foregoing is provided for purposes of illustrating, explaining, and describing embodiments of this invention. Modifications and adaptations to these embodiments will be apparent to those skilled in the art and may be made without departing from the scope or spirit of this invention or the following claims.

What is claimed is:

1. A turbine seal, comprising:
   a main body configured to fit at least partially into a recess in a turbine component and to engage the recess to seal the main body to the turbine component;
   a first arm extending laterally from the main body and configured to engage a surface of a turbine component;
   a second arm extending laterally from the main body and positioned generally parallel to the first arm and configured to engage the surface of the turbine component;
   a third arm extending laterally from the main body and positioned between the first and second arms; and
   wherein the third arm includes a first end having a thickness and coupled the main body and a second end having a thickness and positioned on the third arm opposite to the first end, wherein the thickness of the second end is less than the thickness of the first end.

2. The turbine seal of claim 1 wherein the first arm is biased away from a longitudinal axis of the main body.

3. The turbine seal of claim 2, wherein the second is biased away from the longitudinal axis of the main body and away from the first arm.

4. The turbine seal of claim 1, wherein the thickness of the third arm gradually tapers between the first end and the second end.

5. The turbine seal of claim 1, wherein the first arm further comprises at least one sealing element for contacting a sealing surface.

6. The turbine seal of claim 5, wherein the at least one sealing element comprises at least two protrusions for contacting a sealing surface and forming a step seal.

7. The turbine seal of claim 5, wherein the second arm further comprises at least one sealing element for contacting a sealing surface.

8. The turbine seal of claim 7, wherein the at less one sealing element on the second arm comprises at least two protrusions for contacting a sealing surface and forming a step seal.

9. A turbine seal, comprising:
   a main body configured to fit at least partially into a recess in a turbine component and to engage the recess to seal the main body to the turbine component;
   a first arm extending laterally from the main body and configured to engage a surface of a turbine component;
   a second arm extending laterally from the main body and positioned generally parallel to the first arm and configured to engage the surface of the turbine component;
   a third arm extending laterally from the main body and positioned between the first and second arms;
   wherein the first arm further comprises at least one sealing element for contacting a sealing surface;
   wherein the second arm further comprises at least one sealing element for contacting a sealing surface; and
   wherein the at least one sealing element comprises at least two protrusions for contacting a sealing surface and forming a step seal.

10. A turbine seal, comprising:
    a main body;
    a first arm extending laterally from the main body and configured to engage a surface of a turbine component, wherein the first arm is biased away from a longitudinal axis of the main body and includes at least one sealing element;
    a second arm extending laterally from the main body and positioned generally parallel to the first arm and configured to engage the surface of the turbine component, wherein the second arm is biased away from the longitudinal axis of the main body and away from the first arm and includes at least one sealing element;
    a third arm extending laterally from the main body and positioned between the and second arms;
    wherein the main body is configured to fit at least partially into a recess in turbine component and to engage the recess to seal the main body to the turbine component; and wherein the at least one sealing element of the first arm comprises at least two protrusions for sealing the turbine seal to the turbine component and forming a step seal.

* * * * *